UNITED STATES PATENT OFFICE.

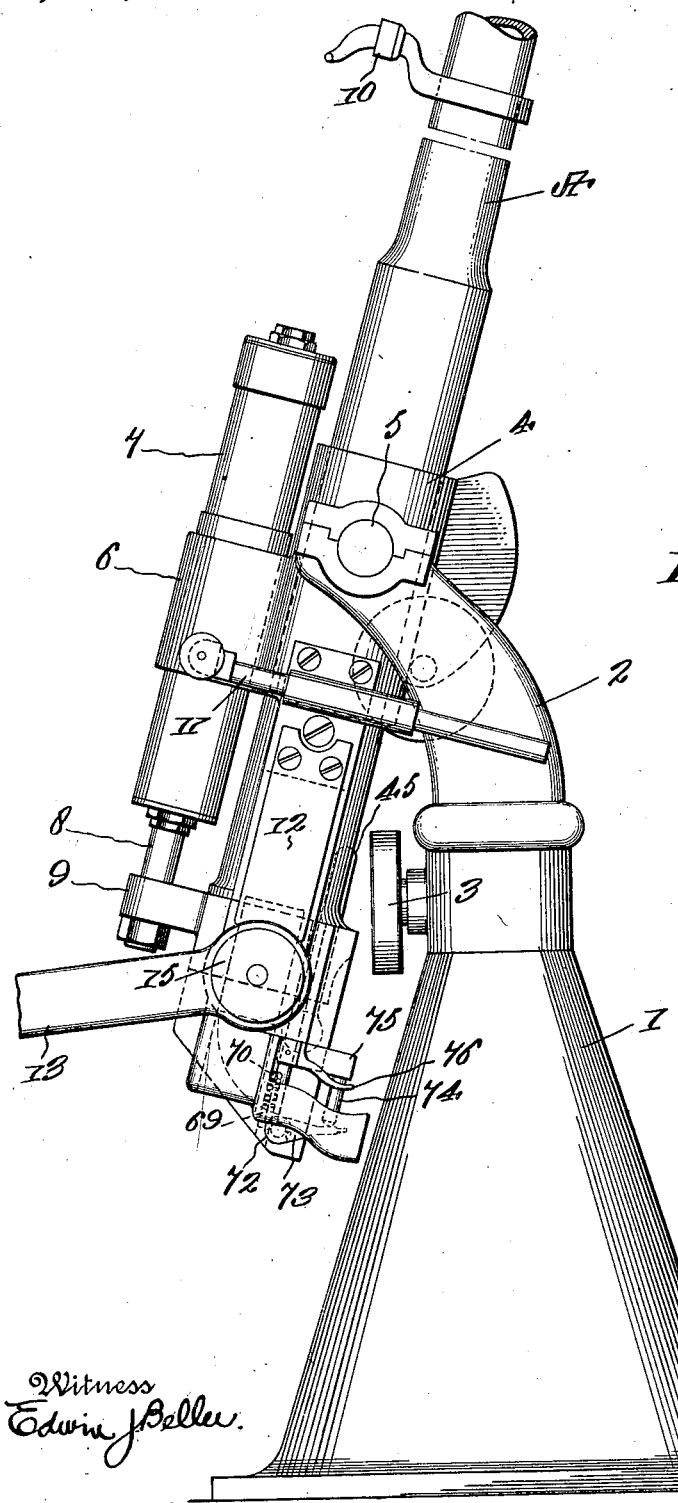

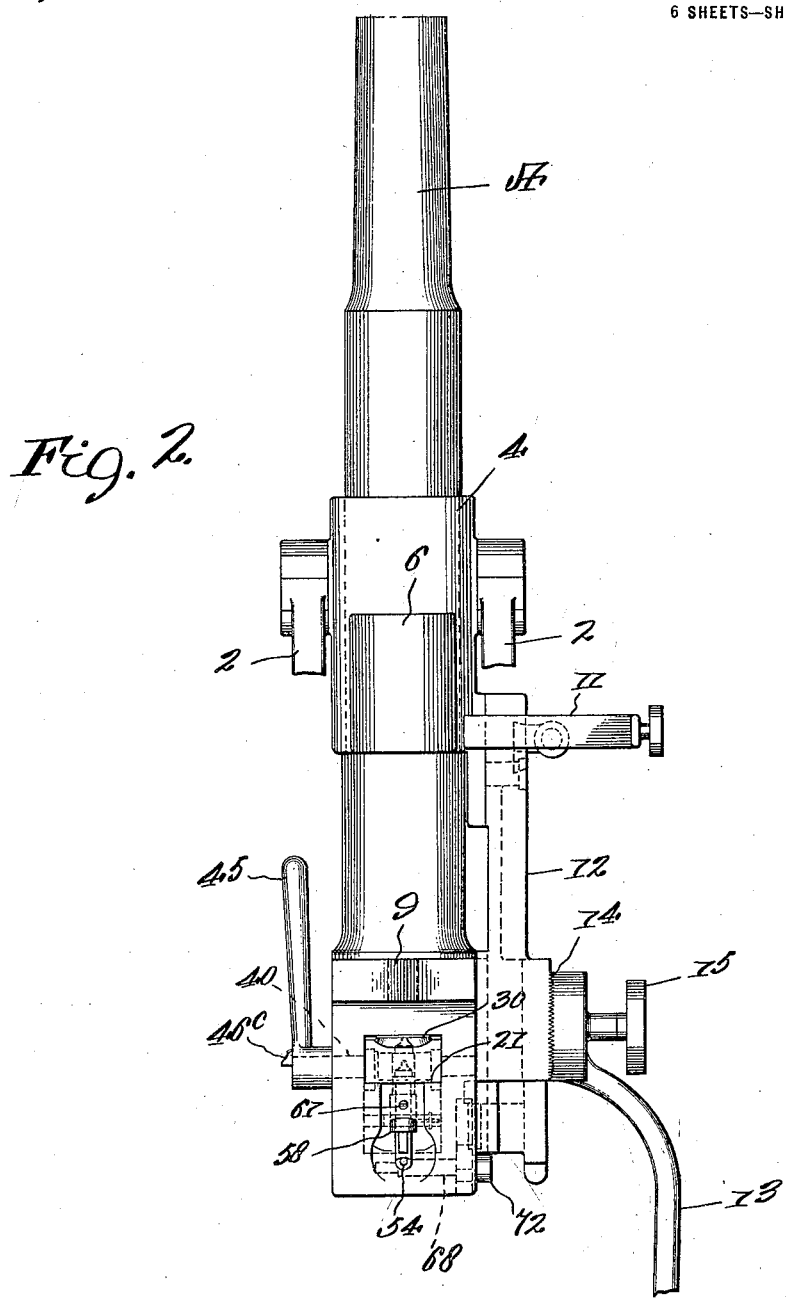

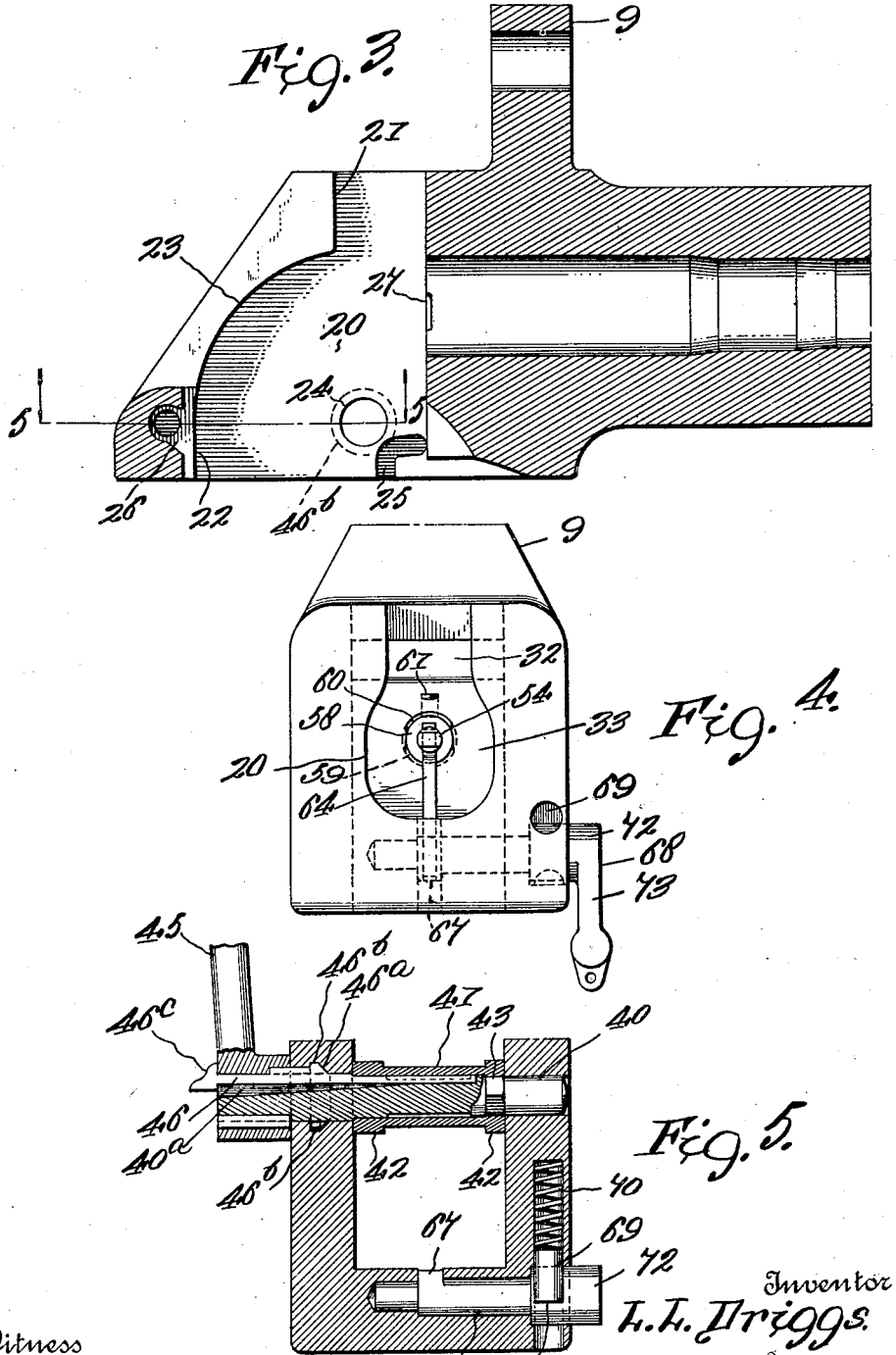

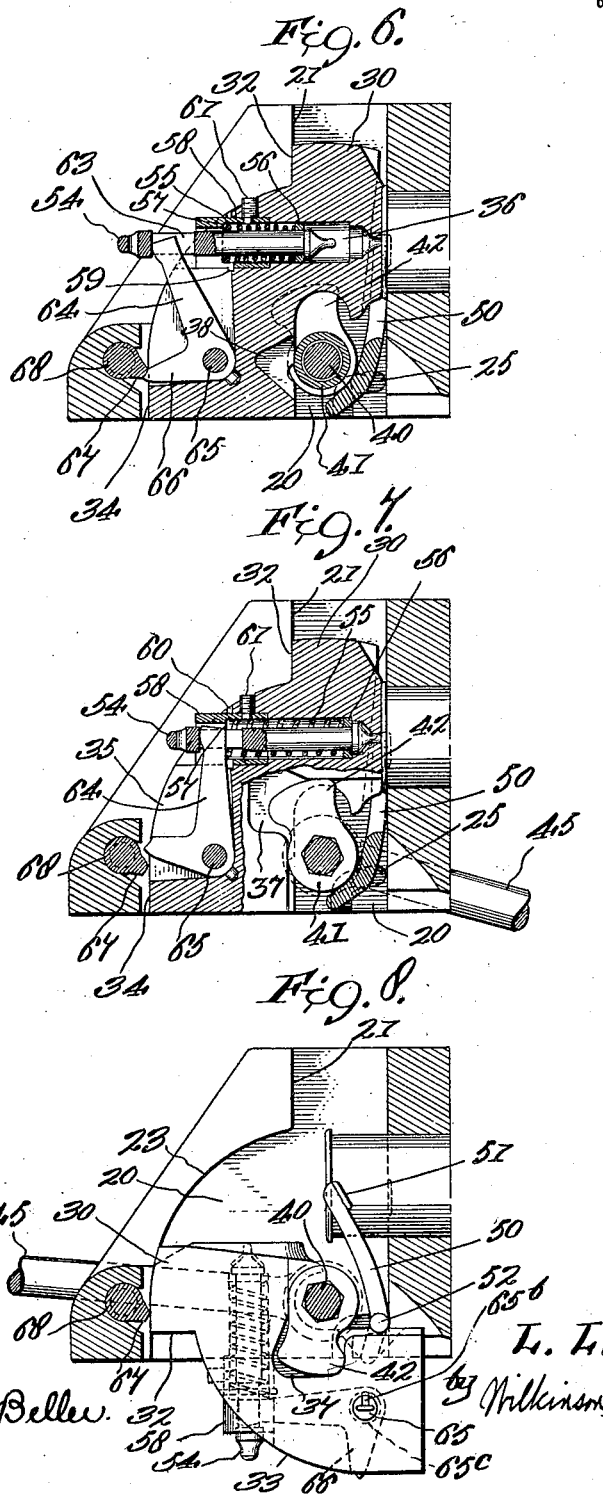

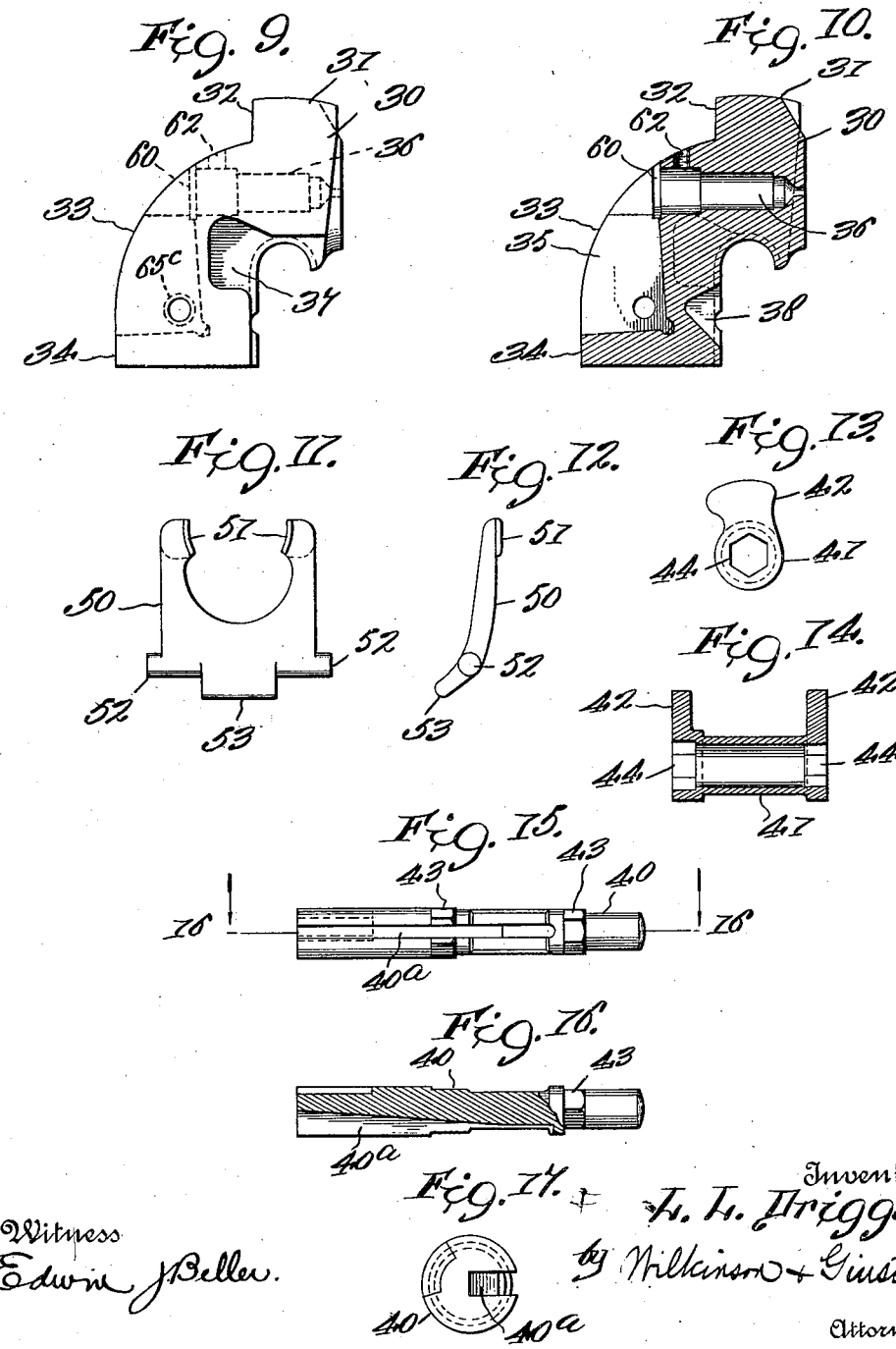

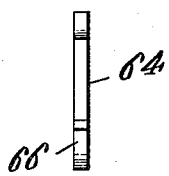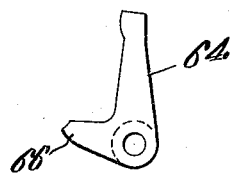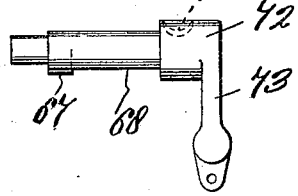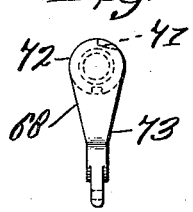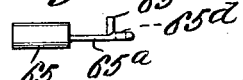

LOUIS L. DRIGGS, OF NEW YORK, N. Y.

BREECH-LOADING GUN.

1,321,422.  Specification of Letters Patent.  Patented Nov. 11, 1919.

Application filed November 9, 1917. Serial No. 201,102.

*To all whom it may concern:*

Be it known that I, LOUIS L. DRIGGS, a citizen of the United States, residing at New York, in the county of New York and State of New York, have invented certain new and useful Improvements in Breech-Loading Guns; and I do hereby declare the following to be a full, clear, and exact description of the invention, such as will enable others skilled in the art to which it appertains to make and use the same.

My present invention relates to improvements in breech loading guns, and especially light guns to be used against air craft; and the said invention is intended to provide a gun which may be readily and conveniently operated, and which may be fired at high angle elevation, and in which the parts may be readily assembled and taken apart without the use of special tools.

My invention is also intended to provide a gun of simple and rugged construction in which the cartridge can be loaded without the likelihood of any injury to the hands of the loader.

My invention will be more clearly understood after reference to the accompanying drawings, in which:—

Figure 1 shows a side elevation of the gun mounted on a mount adapted for high angle fire.

Fig. 2 is a plan view of the gun removed from the mount, and with the recoil cylinder removed therefrom.

Fig. 3 shows a central vertical section through the breech of the gun with all of the operating parts removed therefrom.

Fig. 4 is a rear view of the breech of the gun, showing the breech block in the loaded position.

Fig. 5 shows a section along the line 5—5 of Fig. 3, but with the operating shaft and the sear in place.

Fig. 6 shows a central vertical section through the breech of the gun, showing the breech mechanism in the closed position and the firing mechanism cocked.

Fig. 7 is a similar view to Fig. 6, but shows the firing mechanism in the position it assumes after the piece has been fired.

Fig. 8 is a similar view to Figs. 6 and 7, but shows the breech block in elevation and the breech open, and the cartridge case partly withdrawn.

Fig. 9 is a side elevation of the breech block as detached from the gun and all the parts removed therefrom.

Fig. 10 shows a central vertical section through the breech block shown in Fig. 9.

Fig. 11 is a rear view and

Fig. 12 a side view of the extractor for extracting the empty cartridge case.

Fig. 13 is an end view of the sleeve mounted on the operating shaft, and provided with arms to engage the breech block.

Fig. 14 is a central vertical section of the same;

Fig. 15 is a plan view, and

Fig. 16 a side elevation, partly in section, of the operating shaft, the section being along the line 16—16 of Fig. 15.

Fig. 17 is an end view of said shaft as seen from the left of Fig. 16, but on a larger scale.

Fig. 18 is an inverted plan view of the spring for locking the operating shaft in position in the gun, and for releasing same when desired.

Fig. 19 is a side elevation of the spring shown in Fig. 18.

Fig. 20 is an end view of the operating handle.

Fig. 21 is a plan view of the operating handle, partly in section along the line 21—21 of Fig. 20.

Fig. 22 is an end view, and

Fig. 23 a side elevation of the cocking lever.

Fig. 24 and Fig. 25 are a side elevation and an end view, respectively, of the sear piece.

Fig. 26 shows a plan view,

Fig. 27 a side view, and

Fig. 28 an end view of the pivot pin on which the cocking lever is journaled.

Fig. 29 shows an end view of the bushing used in connection with the firing pin; and Fig. 30 shows a section of the same along the line 30—30 of Fig. 29.

1 represents the pedestal of a gun mount adapted for firing at high elevations, in which is journaled the yoke 2, which yoke may be clamped in the pedestal by means of the hand clamp 3.

4 represents the sleeve or cradle provided with trunnions 5 which are journaled in bearings in the yoke 2. This sleeve is provided with the ring member 6 adapted to receive a recoil cylinder 7 mounted above the gun.

The piston rod 8 of said recoil cylinder is connected to the arm 9 on the gun body A. By having the recoil cylinder 7 on top of the gun, and having the yoke 2 goose-necked as shown in Fig. 1, a high angle of fire may be secured.

The gun is provided with a suitable front sight 10, and a rear sight 11, the latter being vertically adjustable as shown in Fig. 1.

The cradle 4 is provided with a rearwardly-extending side plate 12 to which the pointing bar 13 is adjustably connected, as by means of the circular rack 14 and clamp screw 15.

The gun body A is provided with the breech block chamber 20, having the substantially vertical walls 21 and 22, and the curved wall 23, to engage the breech block when the latter is in the closed position shown in Figs. 6 and 7. It is also perforated, as at 24, to receive the operating shaft. and has also provided curved grooves 25 for the extractor lugs, and with a recess 26 for the toe of the sear. It is also provided with grooves 27 to receive the claws of the extractor. In front of the shoulder 21, the breech of the gun is provided with substantially vertical grooves to receive the upper end of the breech block; and between the curved rear walls 23 the breech of the gun is open to the top and rear to facilitate loading the gun.

The breech block 30 is provided with a lug 31, shouldered at the rear as at 32, adapted to engage the shoulder 21 of the breech block chamber, and the rear face of the breech block is curved as at 33; the rear portion 34 of the breech block bearing against the wall 22 of the breech block chamber.

The breech block is chambered, as at 35, to receive the cocking lever, and as at 36 to receive the firing pin and firing pin screw and as at 37 to receive the operating arms carried by the operating shaft; and is also provided with a notch 38 to receive the heel of the extractor when the breech block is thrown to the open position.

40 represents the operating shaft which is journaled in the breech of the gun, and on which is mounted the sleeve 41, provided with operating arms 42 adapted to engage the cam grooves 37 in the breech block. This sleeve is held against movement on the operating shaft by means of the angular portions 43 on the shaft engaging the corresponding angular portions 44 of the sleeve.

Secured on the end of the operating shaft is an operating arm or handle 45, by means of which the breech mechanism is opened or closed by hand.

The operating shaft is removably mounted in the breech of the gun, and it and the handle are locked in place by means of the spring 46, see Fig. 5, mounted in the V-shaped slot 40$^a$ in the operating shaft, and having a lug 46$^a$ engaging in a groove 46$^b$ in the gun body, and having a head 46$^c$ adapted to engage the outer face of the hand lever 45; but which head can be pressed inward to release said notch and said head from engagement, when desired. By removing this spring the handle may be disengaged from the operating shaft, and the operating shaft may be withdrawn from the gun, leaving the sleeve 41 behind, which will fall out when the shaft is removed.

The extractor 50 is preferably made in a single piece, as shown in Figs. 11 and 12, and is provided with claws 51 adapted to engage the rim of the cartridge case, with lugs 52 adapted to fit in the grooves 25 in the gun body, and with a heel 53 which engages the breech block when the latter is swung open, and causes the extractor to roll along the front wall of the breech block chamber with a decreasing leverage and increasing acceleration, whereby a slow prying out motion under great power is secured, and a quick ejecting motion after the cartridge case has been started from its seat is also secured.

The firing pin 54 is mounted in the recess 36 in the breech block, and the firing spring 55 is held between the collar 56 on the firing pin and the shoulder 57 of the bushing 58, see Figs. 6, 7, 29 and 30. This bushing has an interrupted screw thread 59 which engages in the groove 60 in the breech block, see Figs. 6, 9 and 10. By inserting this bushing in the inverted position and then turning it through 180 degrees, the screw threads 59 engage in the groove 60, and the bushing may be locked in place by means of a set screw 61 passing into the recess 62.

The slot in the firing pin is elongated, as shown at 63, in Figs. 6 and 7, so that the firing pin may be drawn backward without pulling backward on the cocking lever 64, whose head projects up into this slot. This cocking lever is in the form of a bell crank lever pivoted at 65, and having an arm 66 engaging the toe 67 of the sear piece 68. This sear piece, which is shown in detail in Figs. 24 and 25, and also in Figs. 4 and 5, is journaled in the breech of the gun, and is held in place by means of a locking block 69 pressed backward by a spring 70 and engaging in a notch 71 in the enlarged portion 72 of the sear piece; this spring 70 also serves as the sear spring.

The enlarged portion 72 is provided with a firing arm 73 which is normally drawn up by means of the spring 70 to the position shown in Fig. 1, where it engages the arm 74 projecting rearward from the sliding trigger block 75, which may be pulled backward by the trigger 76 against the action of the spring 70. By pulling back on the trigger, this arm 73 will be moved rearward and the toe 67 will be released from engagement with the arm 66 of the cocking lever and the firing pin will be released.

In order to provide for the quick insertion or removal of the cocking lever from the gun, I provide a removable pivot pin therefor, as shown in Figs. 26 and 27, in which 65 represents the pivot pin member on which the cocking lever is pivoted, which is provided with a spring arm 65$^a$ having a lug 65$^b$ adapted to snap into a groove 65$^c$ in the breech block. This spring arm 65$^a$ is provided with an eye 65$^d$, and by inserting a hook or other convenient tool into this eye, the lug 65$^b$ may be sprung out of the notch in the breech block, and the pivot pin 65 may be conveniently withdrawn, thus permitting the withdrawal of the cocking lever.

The operation of the gun is as follows:

Suppose the breech block to be open, as indicated in Fig. 8, insert the cartridge and swing the hand lever 45 upward. This will force the cartridge home, with the claws of the extractor in front of the rim of the cartridge case. As the breech block closes, the arm 66 of the cocking lever will engage the toe 67 of the sear piece, and the firing pin will be drawn to the rear, and the cocking lever and the parts will then be in the position shown in Fig. 6. Now by pulling on the trigger 76 the sear piece will be rocked to the position shown in Fig. 7 against the action of the spring 70, and the firing pin will be released and will fly forward exploding the primer, and the firing pin will be drawn slightly rearward again, owing to the spring 55 engaging the upper arm of the cocking lever 64; the rearward motion of the firing pin being limited by the collar 56 which bears against the shoulder in the breech block, as shown in Fig. 7. Thus the point of the firing pin will be masked by the front face of the breech block, and the firing pin will be protected against injury, and also the danger of premature explosion of a fresh cartridge case when the gun is loaded will be largely decreased.

After the gun is fired, the breech may be opened by swinging the hand lever 45 in the reverse direction, when the arms 42 on the sleeve 41 will engage the corresponding grooves 37 in the breech block, but will first move the breech block down to the rear and will then swing it backward, returning to the position shown in Fig. 8.

To disassemble the parts, the breech block and the parts carried thereby may be removed by releasing the locking pin 46 and removing the hand lever 45 and withdrawing the operating shaft 40, when the sleeve will drop out and the breech block and the parts carried thereby may be bodily removed.

To remove the cocking lever, spring the lug 65$^b$ out of engagement with the notch in the breech block and withdraw the pivot pin 65, when the cocking lever may be removed.

To remove the firing pin, release the set screw 61, give a half turn to the bushing 58, thus releasing the interrupted screw threads 59 and withdraw the bushing firing pin, and spring from the breech block.

To remove the sear piece, push the locking pin 69 back against the spring 70, turn the sear piece until the toe 67 fits down in the recess 26 in the breech block chamber, and then withdraw the sear piece. The pin 69 and spring 70 may then be removed if desired.

To assemble the parts, reverse the operation.

It will thus be seen that I provide a simple and strong mechanism, the parts of which may be readily assembled and disassembled as desired. By having the upper and rear portion of the breech open as shown, the mechanism may be quickly and conveniently loaded, and there is no danger that the hand of the loader will be caught in any part of the mechanism in the operation of closing the breech.

It will be obvious that various modifications might be made in the herein described construction, and in the combination and arrangement of parts which could be used without departing from the spirit of my invention; but I do not mean to limit the invention to precise details except as pointed out in the claims.

Having thus described my invention what I claim and desire to secure by Letters Patent of the United States is:—

1. In a breech loading gun, the combination with a gun body provided with a breech block chamber having substantially vertical shoulders at each side of the top thereof, and curved rear walls on each side thereof with an opening to the top and rear, of a breech block provided with an upwardly-projecting lug adapted to engage said vertical shoulders, and a curved rear face adapted to engage said curved rear walls of the gun body, the said breech block being also provided with cam grooves in the lower part thereof, an operating shaft journaled in the gun body and provided with cam arms engaging in said cam grooves, and means for turning said operating shaft, substantially as described.

2. In a breech loading gun, the combination with a gun body provided with a breech block chamber having substantially vertical shoulders at each side of the top thereof, and curved rear walls on each side thereof with an opening to the top and rear, of a breech block provided with an upwardly-projecting lug adapted to engage said vertical shoulders, and a curved rear face adapted to engage said curved rear walls of the gun body, the said breech block being also provided with cam grooves in the lower part thereof, an operating shaft journaled in the gun body and provided with cam arms engaging in said cam grooves, and a hand lever for turning said operating shaft, substantially as described.

3. In a breech loading gun, the combination with a gun body provided with a breech block chamber having substantially vertical shoulders at each side of the top thereof, and curved rear walls on each side thereof with an opening to the top and rear, of a breech block provided with an upwardly-projecting lug adapted to engage said vertical shoulders, and a curved rear face adapted to engage said curved rear walls of the gun body, the said breech block being also provided with cam grooves in opposite sides thereof, an operating shaft journaled in the gun body, a sleeve slidably mounted on said shaft and provided with cam arms engaging in said cam grooves, means for holding said sleeve against rotation on said shaft, and means for turning said operating shaft, substantially as described.

4. In a breech loading gun, the combination with a gun body provided with a breech block chamber having substantially vertical shoulders at each side of the top thereof, and curved rear walls on each side thereof, with an opening to the top and rear, of a breech block provided with an upwardly-projecting lug adapted to engage said vertical shoulders, and a curved rear face adapted to engage said curved rear walls of the gun body, the said breech block being also provided with cam grooves in opposite sides thereof, an operating shaft journaled in the gun body, a sleeve slidably mounted on said shaft, and provided with cam arms engaging in said cam grooves, means for holding said sleeve against rotation on said shaft, a hand lever for turning said operating shaft, and a spring member adapted to lock said operating shaft, said sleeve, and said handle together, but to release same when desired, substantially as described.

5. In a breech loading gun, the combination with a gun body provided with a breech block chamber having substantially vertical shoulders at each side of the top thereof, and curved rear walls on each side thereof with an opening to the top and rear, with curved inside grooves in the lower portion of the opposite walls of the breech block chamber, of a breech block provided with an upwardly-projecting lug adapted to engage said vertical shoulders, and a curved rear face adapted to engage said curved rear walls of the gun body, the said breech block being also provided with cam grooves in opposite sides thereof, and with a groove for the heel of the extractor, an operating shaft journaled in the gun body and provided with cam arms engaging in said cam grooves, means for turning said operating shaft, and an extractor adapted to roll along the front face of the breech block chamber and provided with trunnions engaging said curved grooves in the walls of the breech block chamber, and having a heel engaging in said extractor groove in the breech block, substantially as described.

6. In a breech loading gun, the combination with a gun body provided with a breech block chamber having substantially vertical shoulders at each side of the top thereof, and curved rear walls on each side thereof with an opening to the top and rear, with curved grooves in the inside lower portion of the opposite walls of the breech block chamber, of a breech block provided with an upwardly-projecting lug adapted to engage said vertical shoulders, and a curved rear face adapted to engage said curved rear walls of the gun body, the said breech block being also provided with cam grooves in opposite sides thereof, and with a groove for the heel of the extractor, an operating shaft journaled in the gun body and provided with cam arms engaging in said cam grooves, a hand lever for turning said operating shaft, and an extractor adapted to roll along the front face of the breech block chamber and provided with trunnions engaging said curved grooves in the walls of the breech block chamber, and having a heel engaging in said extractor groove in the breech block, substantially as described.

In testimony whereof, I affix my signature.

LOUIS L. DRIGGS.

Copies of this patent may be obtained for five cents each, by addressing the "Commissioner of Patents, Washington, D. C."